US009535232B2

(12) United States Patent
Vogt

(10) Patent No.: US 9,535,232 B2
(45) Date of Patent: Jan. 3, 2017

(54) METHOD AND DEVICE FOR DETERMINING THE DEPTH OF FIELD OF A LENS SYSTEM FOR A DISTANCE MEASURED BY MEASURING OPTICS

(71) Applicant: Philippe Vogt, Bussieres (FR)

(72) Inventor: Philippe Vogt, Bussieres (FR)

(*) Notice: Subject to any disclaimer, the term of this patent is extended or adjusted under 35 U.S.C. 154(b) by 0 days.

(21) Appl. No.: 14/394,663

(22) PCT Filed: Apr. 4, 2013

(86) PCT No.: PCT/EP2013/057086
§ 371 (c)(1),
(2) Date: Oct. 15, 2014

(87) PCT Pub. No.: WO2013/156313
PCT Pub. Date: Oct. 24, 2013

(65) Prior Publication Data
US 2015/0069192 A1    Mar. 12, 2015

(30) Foreign Application Priority Data
Apr. 17, 2012 (DE) .................. 10 2012 103 339

(51) Int. Cl.
*F16M 13/00* (2006.01)
*G02B 7/00* (2006.01)
(Continued)

(52) U.S. Cl.
CPC .............. *G02B 7/003* (2013.01); *F16M 11/14* (2013.01); *F16M 11/242* (2013.01); *G01B 11/14* (2013.01);
(Continued)

(58) Field of Classification Search
CPC .... F16C 11/106; F16M 11/14; H04N 4/23213
See application file for complete search history.

(56) References Cited

U.S. PATENT DOCUMENTS

| 4,786,934 A | 11/1988 | Kunze et al. |
| 5,384,615 A | 1/1995 | Hsieh et al. |

(Continued)

FOREIGN PATENT DOCUMENTS

| CN | 2269583 Y | 12/1997 |
| CN | 2833516 Y | 11/2006 |

(Continued)

OTHER PUBLICATIONS

English translation of International Preliminary Report on Patentability from corresponding International Application PCT/EP2013/057086, dated Oct. 21, 2014.

(Continued)

*Primary Examiner* — Amy Sterling
(74) *Attorney, Agent, or Firm* — Gardner, Linn, Burkhart & Flory, LLP

(57) ABSTRACT

A method for determining the depth of field for a specific distance by means of measuring optics comprises manual optical focussing of the measuring optics by means of the human eye without projection onto a focussing screen or intermediate projection surface, monitoring of the movement of the measuring optics mechanism during focussing, determining and indicating the adjusted distance from the movement, wherein, with consideration of focal distance, aperture, hyperfocal distance and circle of confusion, the range of the depth of field to the adjusted distance is arithmetically determined and indicated.

10 Claims, 3 Drawing Sheets

(51) Int. Cl.
  *G03B 13/30* (2006.01)
  *G03B 43/00* (2006.01)
  *G02B 27/00* (2006.01)
  *F16M 11/14* (2006.01)
  *F16M 11/24* (2006.01)
  *G01B 11/14* (2006.01)

(52) U.S. Cl.
  CPC ........... *G02B 27/0075* (2013.01); *G03B 13/30* (2013.01); *G03B 43/00* (2013.01)

(56) References Cited

U.S. PATENT DOCUMENTS

| | | | | |
|---|---|---|---|---|
| 8,134,116 | B2 * | 3/2012 | Nunnink | G02B 3/14 250/234 |
| 8,854,532 | B2 * | 10/2014 | Iwasaki | H04N 5/23212 348/348 |
| 2013/0163978 | A1 * | 6/2013 | Carlesso | F16C 11/106 396/428 |

FOREIGN PATENT DOCUMENTS

| DE | 3035586 A1 | 6/1981 |
|---|---|---|
| DE | 3637742 A1 | 5/1988 |

OTHER PUBLICATIONS

International Search Report completed Aug. 30, 2013, from corresponding International Application No. PCT/EP2013/057086.
Written Opinion of the International Searching Authority for International Application No. PCT/EP2013/057086.
"Leica M7 Bedienunbsanleitung/Instructions", Leica Camera AG, cited in accompanying International Search Report from corresponding International Application No. PCT/EP2013/057086.

* cited by examiner

METHOD AND DEVICE FOR DETERMINING THE DEPTH OF FIELD OF A LENS SYSTEM FOR A DISTANCE MEASURED BY MEASURING OPTICS

CROSS REFERENCE TO RELATED APPLICATION

The present application claims the priority benefits of International Patent Application No. PCT/EP2013/057086, filed on Apr. 4, 2013, and claims benefit of DE 10 2012 103 339.0, filed on Apr. 17, 2012.

BACKGROUND OF THE INVENTION

The invention relates to a method for determining the depth of field for a specific distance by means of measuring optics and a corresponding device and an arrangement of the device and of recording optics.

The depth of field or depth of focus is a measurement for the extent of the sharp range in the object space of an imaging optical system. The term is of central significance in photography and describes the size of the distance range within which an object appears sufficiently sharply in the image of the camera optics. As a rule, a large depth of focus is achieved using small apertures or lenses with short focal distances.

Two different arrangements can be fundamentally distinguished: The camera obscura which consists of only a single pinhole aperture, and a lens system which also contains such a aperture but additionally (at least) one lens (in front of or behind the aperture) which produces a regular optical image.

Light beams issuing from an object pass through the pinhole aperture onto the image plane (a screen, a film or a camera image sensor). Depending on the diameter of the aperture, these light beams become conical light bodies of greater or lesser thickness. By cutting the image plane with a cone, a circle, a so-called circle of confusion or blurring circle (Z), is produced on the plane. They exist for any dimension of the distances between the object, aperture and image, the size of the circle in the image plane is calculated according to the theorem on intersecting lines. The influence of the pinhole aperture diameter is simply proportional: the larger the hole, the greater the blurring circle. For sharper imaging a smaller hole is required. However, if the hole is made too small, the range of the geometric optics is exited and the wave properties of light come to predominate. The diffraction effects thus arising are all the greater, the smaller the hole. In this way sharpness is reduced. Therefore for a camera obscura there is an optimum hole diameter. Furthermore, in achieving this optimisation, in addition to the imaging properties it is also necessary to consider the circumstance that with a smaller hole diameter the light flux decreases and therefore the illumination times increase.

The structure with an additional lens changes in principle only in that the lens ensures that (in an ideal scenario) when the image plane is at a specific distance from the lens a sharp image is produced, the above-mentioned lack of precision not occurring at this position (and the aperture opening can be substantially increased in the interests of better light yield). Only in the case of object points which lie in front of or behind this sharply imaged position, does this sharpness decrease and, with increasing distance, fall to the value which the aperture would bring about only as a camera obscura.

In geometric optics the only points which are reproduced as sharp image points in the image plane (film, chip sensor) are those which lie on a plane located at the object distance to the lens. All other points located on planes which are closer or further away no longer appear as points in the image plane but rather as small discs, so-called circles of confusion or blurring circles (Z).

Circles of confusion arise because the light bodies falling from the lens onto the image plane are cones; by cutting the image plane with a cone, a circle is produced on the plane.

Points lying close together which do not lie in the object plane are imaged by circles of confusion lying close beside one another and overlapping and mixing together in the edge regions, whereby a blurred image is produced.

It is therefore desirable to be able to know and/or determine the depth of field for a specific distance and optics.

DE 30 35 568 A1 and DE 36 37 742 A1 each disclose photographic cameras which include automatic sharpness adjustments, the optics of which cast an image on a focussing screen.

SUMMARY OF THE INVENTION

An object of the invention is to provide a simple manual option for determining and indicating the depth of field for a specific distance and optics.

It has been recognised in accordance with an aspect of the invention that the depth of field can be determined precisely and easily by means of a method comprising the following steps:

manual optical focussing of the measuring optics by means of the human eye without projection onto a focussing screen or intermediate projection surface;

monitoring of the movement of the measuring optics mechanism during focussing;

determining and indicating the adjusted distance from the movement, wherein, with consideration of focal distance, aperture, hyperfocal distance and circle of confusion, the range of the depth of field to the adjusted distance is arithmetically determined and indicated.

It is thus possible to dispense with travel-time measurements etc so that only the precision of the measuring optics is relied upon, which is relatively disturbance-free. Furthermore, it is thus possible to precisely focus the object, for which the distance and range of the surrounding sharpness are of interest.

Without projection of an image for focussing onto a focussing screen, the human eye to which the optics are adapted is used directly. Thus no intermediate projection surface between the optics and the eye is used.

There is consequently also no projection onto an image sensor, A/D converter etc, but rather the eyeball serves as a projection surface, deliberately omitting the focussing screen.

It is also possible to consider the so-called focus shift. Focus shift (FS) means a shift in the focal plane in dependence upon the adjusted aperture. The strength of the focus shift depends on the design of the respective lens and is not fundamentally dependent on the camera used. The FS can thus be removed only by corrections concerning the respective lens.

By evaluation of the sharpness adjusted by means of the eye the adjusted distance is determined quickly and precisely. This is a prerequisite of the method for determining the depth of field.

Evaluation and matching of the mechanical sensor thus effect a precise determination of the sharpness or distance on an optical basis by means of the human eye. The monitoring of the mechanism is substantially more precise than purely manual focussing. Dispensing with autofocus permits small, compact construction and low power consumption.

Measuring optics are understood to be optics which are predominantly used only for measuring the distance for depth of field determination. In contrast, the recording optics serve to record images, e.g. in the case of a camera.

In order to influence the measuring optics as little as possible and to achieve particularly precise monitoring, provision is made in one embodiment for the mechanism to be monitored in a contact-free manner. An inductively coupled rotary sensor, for instance, can be considered as a sensor for this purpose, this rotary sensor then tapping e.g. the threaded worm gear via a friction wheel.

In the simplest form the determination of the adjusted distance from the movement of the optics is effected in tabular form; i.e. which movement of the sensor corresponds to which distance or relative change in the optics is stored for the computer. Therefore from the extent of the movement of the optics a conclusion is drawn about the adjusted distance.

It is useful that not only a single depth of field is determined but the determination and indication of the range of the depth of field is effected for a plurality of aperture values e.g. 5, 6, 8, 11 and 16. Therefore the photographer is provided with a reference point for the aperture selection.

However, the described method is also suitable for direct use with recording optics. For this purpose the measuring optics are matched to recording optics i.e. the adjustment of the sharpness of the recording optics is matched to that of the measuring optics and possibly readjusts the measuring optics in the event of deviations so that the depth of field can be precisely determined and is useable for the adjustments of the recording optics.

Preferably, for this purpose, directional indicators indicate the displacement direction of the measuring optics during readjustment for matching with the recording optics.

Thus in other words, initially one optic is manually focussed by eye and this adjustment is subsequently corrected by a readjustment. The corrected value is used to arithmetically determine the depth of field, wherein focal distance, aperture, hyperfocal distance and circles of confusion are considered. The near point and far point of the sharpness, i.e. the depth of focus, is output.

Therefore movement of the mechanism during readjustment of the optics can be monitored, i.e. the extent of the movement can be determined and included in the corrected ascertainment of distance.

In order to output the corrected displacement direction for the user, it is useful if direction indicators indicate the displacement direction of the optics during readjustment. Thus simple indicators such as arrows or just LEDs can be used which, according to their placement, indicate, e.g. a direction of rotation to the left or right by lighting up.

A device including manually focusable measuring optics—with no focussing screen, a computer, an output unit and a sensor is suitable for implementing the method, wherein the measuring optics comprise displacement means for manual focussing by means of the human eye, the sensor monitors the movement of the manual focussing operation, and wherein the computer is arranged to determine the distance by evaluation of the signals of the sensor from the monitored mechanism so that, under consideration of focal distance, aperture, hyperfocal distance and circle of confusion, the computer arithmetically determines and outputs the range of the depth of field to the distance.

The optics used are preferably a lens, in particular a Kepler monocular.

A display for indicating the distance and depth of field is preferably provided. Alternatively or additionally an acoustic indication could be effected.

In a preferred embodiment the sensor is connected to the rotatable mechanism of the measuring optics, in particular to the worm gear thread via a friction wheel, so that a high level of precision is achieved.

It is useful if the sensor monitors the movement of the optics mechanism in a contact-free manner, preferably inductively, since it can therefore be tapped precisely and without being influenced.

When the device is connected to recording optics to form an arrangement, in particular a camera, wherein the device is electronically connected to the recording optics for the purpose of data exchange, and the device is arranged to receive the adjusted focal distance and the adjusted focussing from the recording optics, wherein the computer of the device is programmed to effect matching with the evaluation of the signals of the sensor from the monitored mechanism, the depth of field can thus be determined precisely for adjustments of the recording optics by means of the device (cf. above).

Further features and details of the invention will be seen from the following description of the drawings.

Figure 1:
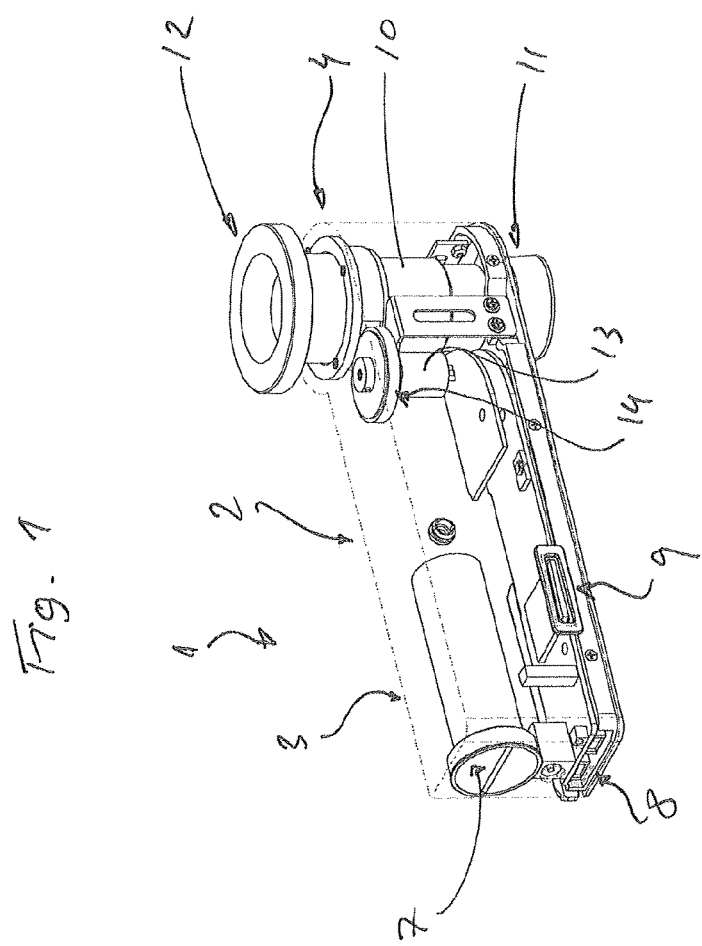
FIG. 1 is a schematic perspective and partially transparent view of a device for determining the depth of field for a specific distance and FIG. 2 is a plan view of the device of FIG. 1 on the side remote from FIG. 1
Figure 2:
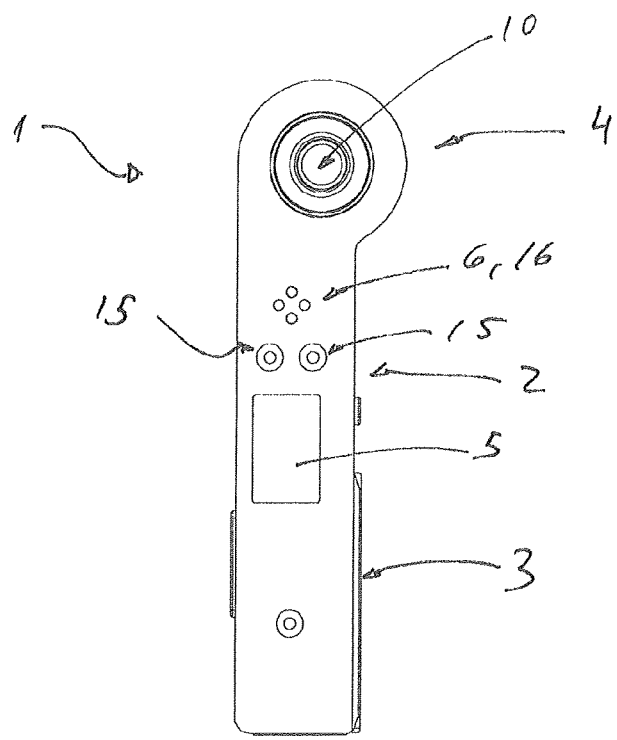

The figures show a device designated as a whole by 1 for determining the depth of field for a specific distance.

The device includes an elongate housing 2 which forms a rod-like handle part 3 and an optics part 4. In the handle part 3 there are provided a computer (not visible), a display 5, operating elements 6, a battery compartment 7 for power supply, electrical and electronic interfaces 8 for the stationary power supply and/or electronic attachment to a camera and a memory card slot 9 for a memory card.

The optics part 4 essentially contains the measuring optics 10 with the protruding eye cup 11 on one side and the focussing ring 12 on the other side. A Kepler monocular is used as the optics.

In the region of the transition between the optics part 4 and handle part 3 a sensor 13 is disposed which is connected via a friction wheel 14 to the rotatable mechanism (worm-gear) of the measuring optics 10. The sensor is an inductive rotary sensor and, in a contact-free manner, senses the movement of the mechanism of the measuring optics.

The display 5 serves to indicate the distance and depth of field.

In addition, direction indicators 15 in the form of LEDs are provided to display the displacement direction of the optics during readjustment. These are employed when the device is used as an arrangement with an electronically attached camera (cf. below).

Not only is a single depth of field determined and displayed but the determination and display of the range of the depth of field are effected for a plurality of aperture values 5, 6, 8, 11 and 16 on the display 5. Therefore the photographer is provided with a reference point for the aperture selection.

In addition, an actuating button 16 is used to effect switching on and off.

The device functions or is used alone in the following manner:

Firstly the optics 10 are manually focussed by eye at the focussing ring 12. This sharpness is the adjusted sharpness or distance. This adjustment is detected by the sensor 13 and subsequently the distance is ascertained in a tabular manner by the computer and the depth of field is calculated accordingly.

Figure 3:
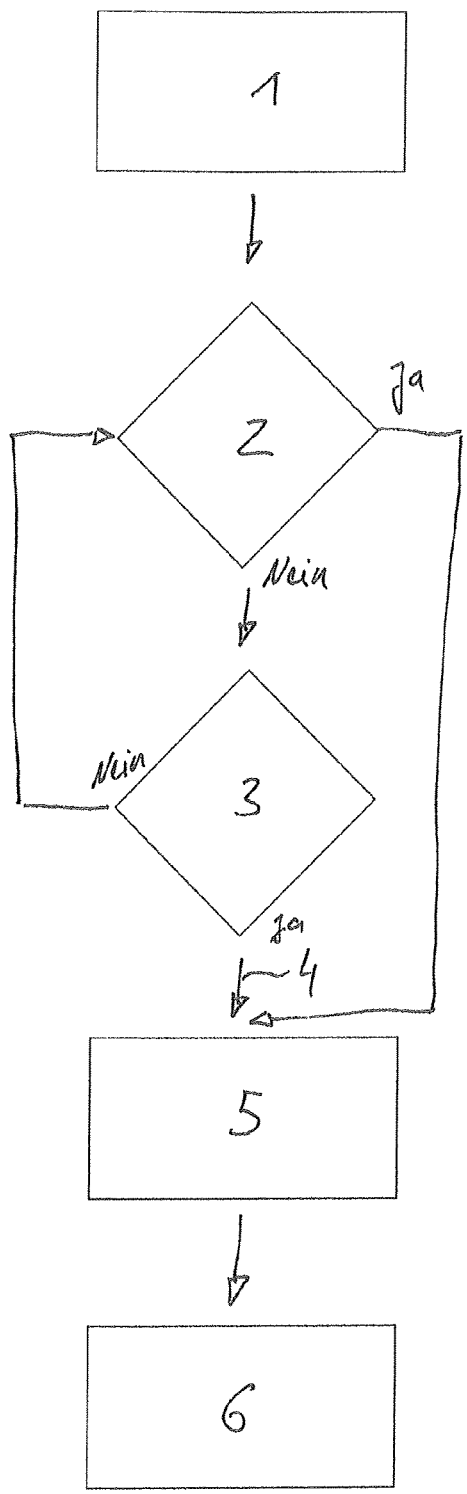
FIG. 3 is a flow diagram of the process of using the device of FIG. 1 for determining the depth of field for a specific distance.

The device functions or is used in the following manner (cf. FIG. 3) when it is coupled to a camera (e.g. by a USB cable via the interface 8).

First the optics 10 are manually focussed by eye at the focussing ring 12. This sharpness is the adjusted sharpness or distance. This adjustment is detected by the sensor 13 and then the distance is ascertained in a tabular manner by the computer (analogously to the case above). This adjustment is compared to the sharpness or distance adjusted at the camera, for which purpose a data exchange or matching takes place via the interface 8. (Step 1)

Subsequently a check is made whether the adjusted sharpness or the thus selected distance is correct or matches that of the camera (Step 2).

This will not usually be the case.

By flashing of the LEDs 15 the necessary displacement direction for the readjustment of the measuring optics is displayed (Step 3), i.e. when the focussing ring 12 must be rotated counter-clockwise for readjustment purposes, the left LED flashes, in the converse case, the right LED flashes for the other displacement direction of the focussing ring 12. With the aid of the LEDs 15 the focussing ring 12 is used to readjust the sharpness or distance until the adjusted distance or the corrected sharpness corresponding to the camera is set (Step 4).

If the device ascertains the adjustment of the correct sharpness or distance, both LEDs light up continuously (Step 5).

This adjustment is the corrected or readjusted sharpness or distance. This is used by the computer to arithmetically determine the depth of field, wherein focal distance, aperture, hyperfocal distance and circles of confusion are considered, which issue from the camera as a result of the data exchange.

The calculated values (Step 6) are output on the display 5, wherein near and far points of the sharpness for a plurality of apertures (cf. above) are indicated.

Therefore the device only outputs the values which are valid for the camera.

The invention claimed is:

1. Device for determining the depth of field for a specific distance, comprising manually focusable measuring optics with no focussing screen, a computer, an output unit and a sensor, wherein the measuring optics comprises a manually displaceable mechanism configured for manual focussing by an operator by means of the human eye, wherein the sensor is configured to monitor the movement of the displaceable mechanism during manual focussing of the measuring optics by the operator from an unfocused condition to a focused condition, and wherein the computer is arranged to determine the distance by evaluation of signals of the sensor from the monitored movement of the displaceable mechanism so that, under consideration of focal distance, aperture, hyperfocal distance and circle of confusion, the computer arithmetically determines and outputs the range of the depth of field to the distance.

2. Device as claimed in claim 1, wherein the measuring optics comprises a monocular lens.

3. Device as claimed in claim 2, wherein a display for indicating the distance and depth of field is provided.

4. Device as claimed in claim 3, wherein the manually displaceable mechanism of the measuring optics comprises a rotatable mechanism and wherein the sensor is engaged with the rotatable mechanism of the measuring optics via a friction wheel.

5. Device as claimed in claim 1, wherein the manually displaceable mechanism of the measuring optics comprises a rotatable mechanism and wherein the sensor is engaged with the rotatable mechanism of the measuring optics via a friction wheel.

6. Device as claimed in claim 1, wherein the sensor operates inductively.

7. A system for determining the depth of field for a specific distance, said system comprising the device of claim 1 and further including recording optics, wherein the device is electronically connected to the recording optics for data exchange, and wherein the device is configured to receive the adjusted focal distance and the adjusted focussing from the recording optics, wherein the computer of the device is configured to effect matching with the evaluation of the signals of the sensor from the monitored displaceable mechanism.

8. The system as claimed in claim 7, wherein the device comprises direction indictors for a displacement direction of the measuring optics by reason of the matching.

9. The system as claimed in claim 8, wherein the direction indicators comprise LEDs.

10. The system as claimed in claim 7, wherein the recording optics comprise a camera.

* * * * *